(12) United States Patent
Taylor

(10) Patent No.: US 10,984,402 B2
(45) Date of Patent: Apr. 20, 2021

(54) SYSTEM FOR PROVIDING A PEER-TO-PEER BEHAVIORAL DATA EXCHANGE IN A DECENTRALIZED MARKETPLACE

(71) Applicant: Clinton Taylor, Barrington, NH (US)

(72) Inventor: Clinton Taylor, Barrington, NH (US)

(*) Notice: Subject to any disclaimer, the term of this patent is extended or adjusted under 35 U.S.C. 154(b) by 264 days.

(21) Appl. No.: 16/178,327

(22) Filed: Nov. 1, 2018

(65) Prior Publication Data

US 2020/0143352 A1    May 7, 2020

(51) Int. Cl.
| | |
|---|---|
| G06Q 20/22 | (2012.01) |
| G06Q 20/12 | (2012.01) |
| G06Q 30/06 | (2012.01) |
| G06Q 30/08 | (2012.01) |
| G06Q 20/42 | (2012.01) |
| G06Q 30/02 | (2012.01) |
| H04L 9/06 | (2006.01) |
| G06F 16/14 | (2019.01) |

(52) U.S. Cl.
CPC ......... *G06Q 20/223* (2013.01); *G06F 16/152* (2019.01); *G06Q 20/123* (2013.01); *G06Q 20/42* (2013.01); *G06Q 30/0204* (2013.01); *G06Q 30/0601* (2013.01); *G06Q 30/08* (2013.01); *H04L 9/0637* (2013.01); *H04L 2209/38* (2013.01)

(58) Field of Classification Search
None
See application file for complete search history.

(56) References Cited

U.S. PATENT DOCUMENTS

| | | | | |
|---|---|---|---|---|
| 10,755,327 | B2* | 8/2020 | Nagla | G06Q 30/08 |
| 2019/0050855 | A1* | 2/2019 | Martino | H04L 9/0643 |
| 2019/0102837 | A1* | 4/2019 | Smith | H04L 67/10 |
| 2019/0237169 | A1* | 8/2019 | Culver | H04L 9/3247 |
| 2020/0067714 | A1* | 2/2020 | Nair | H04L 51/12 |

FOREIGN PATENT DOCUMENTS

WO    WO-2019144400 A1 *   8/2019  ............. H04L 63/12

* cited by examiner

*Primary Examiner* — Scott A Zare

(57) ABSTRACT

Disclosed is a system for providing a peer-to-peer exchange of data files and payments between a seller computing device and a buyer computing device over a communication network in a decentralized marketplace. The system includes a decentralized blockchain database, a private database, plurality of modules stored in the decentralized blockchain database, a graphical user interface and a processing unit. The decentralized blockchain database represents the storage of information related to selling and buying of data files in a peer-to-peer marketplace. The private database stores information related to personal data related to sellers and buyers. The plurality of modules includes a registration module, a data management module, a purpose module, a data signature module, a data transaction module, and a buyer confirmation module. The seller delivers the data file to the buyer using peer-to-peer data transfer medium.

6 Claims, 13 Drawing Sheets

SYSTEM FOR PROVIDING A PEER-TO-PEER BEHAVIORAL DATA EXCHANGE IN A DECENTRALIZED MARKETPLACE

BACKGROUND OF THE INVENTION

1. Field of the Invention

The present invention generally relates to a system for purchasing and selling of peer-to-peer behavioral data, and more particularly relates to a system for providing a peer-to-peer behavioral data exchange in a decentralized marketplace.

2. Description of Related Art

According to Crunchbase.com, there are over 2,000 organizations in the market research industry, with each organization performing dozens to hundreds of consumer behavior studies per year. Tens of thousands of consumer behavior studies are run annually.

Every study executed by suppliers (i.e., researchers) employs more research techniques than ever before, due to science pulling back the curtain on exactly what goes into human decision-making and increasingly newer ways to measure it. The Q3&4 2017 Greenbook Research Industry Trends (GRIT) Report states, "Suppliers typically work with many companies, and may use a different range of techniques with different clients."

This has produced an increasingly fragmented market with more research data suppliers than ever before, yet all techniques continue to grow. The ESOMAR 2017 report states, " . . . a gradually increasing level of investment is being spread among a fast-expanding number and array of suppliers. Yet, these proportions represent pieces of a growing pie; even though newer approaches are gradually taking share, market research as it's traditionally been defined is still growing year-on-year."

Thus, study by study, there are more independent transactions for research data than ever before, and it's increasing. Suppliers are more like middlemen, being paid by the end-client for insights and paying sub-suppliers for data from specialty techniques used to derive those final insights.

Therefore, there is an organically-produced ecosystem that can be leveraged here. With blockchain-based decentralized systems being groomed to permanently evolve the commercial transaction itself, and there currently being no forum in this $45B industry based on meritocracy where this fragmented market can transact strictly in data (and, potentially down the road, cryptocurrency), there is an opportunity to fulfill a need for a peer-to-peer marketplace that can transact research data with unprecedented technological, methodological and financial efficiency.

Currently available systems which do this are privately owned closed networks, providing data exchange marketplaces that require third-party vetting processes and ultimately third-party trust, centralizing all operations, regulatory oversight and transparency to a single private authority. Further, data file confidentiality must be entrusted to an unknown third party. The costs of doing business with third-party ownership are passed onto the customers, yielding an inefficient model.

These existing platforms do not provide the following functionality in a decentralized, peer-to-peer way which alleviates the inefficiencies of private third-party ownership: research data exchange, data valuation, buyer valuation, seller valuation, non-fiat-based transactions, transactional security, product delivery, product authenticity, product confidentiality and community-enforced oversight.

Though other systems generate a hash value to digitally sign a data file, the hash value has never been used before for authenticating the product which is a data file such that it promotes a method of exchange that is superior in terms of transaction execution efficiency and security among sellers and buyers of data.

Therefore, there is a need for a system for providing a peer-to-peer data exchange in a decentralized marketplace. Further, the system should allow sellers to offer cryptographically-signed data files to be authenticated by buyers on purchase. Furthermore, the system should ensure that the transaction is authentic, data file confidentiality is preserved, and accountability is guaranteed.

SUMMARY OF THE INVENTION

In accordance with teachings of the present invention, a system for providing a peer-to-peer data exchange in a decentralized marketplace is disclosed.

An object of the present invention is to provide a system for providing a peer-to-peer exchange of data files and payments between a seller computing device and a buyer computing device over a communication network in a decentralized marketplace. The system includes a decentralized blockchain database, a private database, plurality of modules stored in the decentralized blockchain database, a graphical user interface and a processing unit.

The decentralized blockchain database represents the storage of information related to selling and buying of data files in a peer-to-peer marketplace. The private database stores information related to personal data related to sellers and buyers. The graphical user interface displays processed modules. The processing unit is coupled to the decentralized blockchain database, the private database and the graphical user interface to process the plurality of modules.

The plurality of modules includes a registration module, a data management module, a purpose module, a data signature module, a data transaction module, and a buyer confirmation module. The seller delivers the data file to the buyer using peer-to-peer data transfer medium.

Another object of the present invention of the system is to provide a buyer request module to allow a buyer to request data not already found on the marketplace. Further, includes a data auction module to allow seller to setup rules for auctioning of the data.

These and other objects, features and advantages of the invention will become more fully apparent in the following detailed description, taken in conjunction with the accompanying drawings.

DETAILED DESCRIPTION OF DRAWINGS

Figure 1:
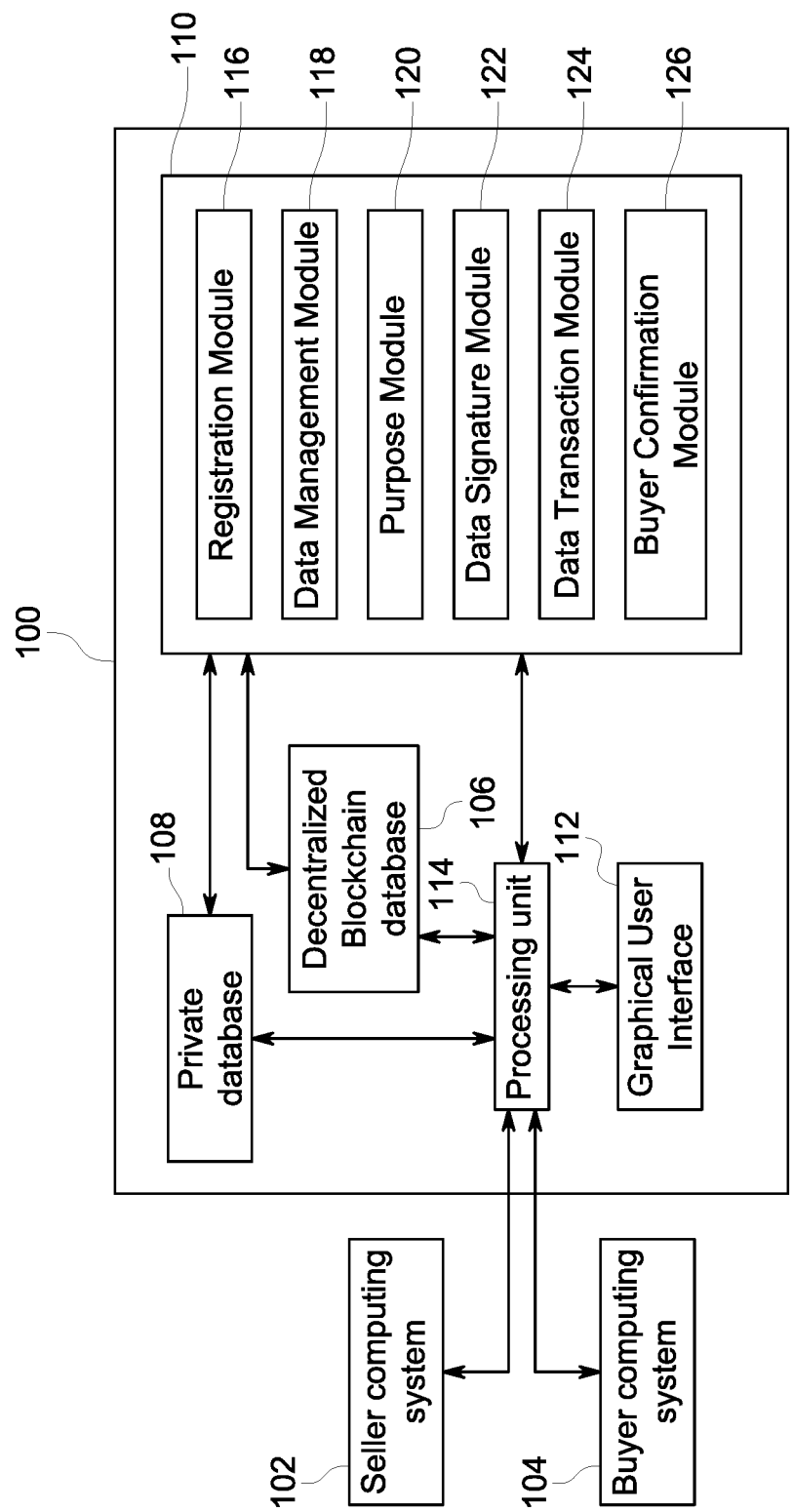
FIG. 1 illustrates a block diagram of a system for providing a peer-to-peer exchange of data files and payments between a seller computing device and a buyer computing device over a communication network in a decentralized marketplace.

While this technology is illustrated and described in a preferred embodiment, a system for providing a peer-to-peer exchange of data files and payments between a seller computing device and a buyer computing device over a communication network in a decentralized marketplace may be produced and described in many different configurations, forms and various computer languages, without deviating from the scope of present invention. There is depicted in the drawings, and will herein be described in detail, as a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the technology described herein.

FIG. 1 illustrates a block diagram of a system 100 for providing a peer-to-peer exchange of data files and payments between a seller computing device 102 and a buyer computing device 104 over a communication network in a decentralized marketplace. The system 100 includes a decentralized blockchain database 106, a private database 108, plurality of modules 110, a graphical user interface 112 and a processing unit 114.

The decentralized blockchain database 106 representing the storage of information related to selling and buying of data files in a peer-to-peer marketplace. The decentralized blockchain database 106 allows sellers and buyers to calculate and update new entries into the database.

The private database 108 stores information related to personal data related to sellers and buyers. Examples of the private database 108 include but not limited to MySQL, SQL Server, Oracle, Amazon RDS, Cassandra, and MongoDB.

The plurality of modules 110 are stored in the decentralized blockchain database 106. The plurality of modules 110 includes a registration module 116, a data management module 118, a purpose module 120, a data signature module 122, a data transaction module 124 and a buyer confirmation module 126.

The graphical user interface 112 displays the processed modules 110. The processing unit 114 is coupled to the decentralized blockchain database 106, the private database 108, and the graphical user interface 112 to process the plurality of modules 110. Examples of the processing unit 114 includes but not limited to a microcontroller, controller, processor, microprocessor and smart computers.

The registration module 116 allows sellers and buyers to register on the decentralized marketplace. The decentralized marketplace then facilitates registration of both sellers and buyers on the decentralized blockchain database 106 and the private database 108. The registration module 116 is explained in detail in conjunction with FIG. 2 of the present invention.

The data management module 118 allows the seller to describe the type of data in data files to be sold. Further, the data management module 118 creates a data set for allowing buyers to easily search for the data files being sold. The data management module 118 is explained in conjunction with FIG. 3 of the present invention.

The purpose module 120 allows users to perform either selling or buying of the data on the decentralized blockchain database. The purpose module 120 allows the buyer to search for the required data in the created data set. The purpose module 120 is explained in detail in conjunction with FIG. 4 to FIG. 6 of the present invention.

The data signature module 122 automatically computes a unique cryptographic file hash value on the accessed data file. The data signature module 122 integrates the hash value in the data set to ensure the authenticity of the accessed data file. The data signature module 122 is explained in detailed in conjunction with FIG. 7 of the present invention.

The data transaction module 124 for allowing the seller to perform either selling of ownership or selling licenses or auction of the data files. The data transaction module 124 further allows the buyer to transfer payment for the transaction of the data file in the decentralized marketplace. The data transaction module 124 is explained in detailed in conjunction with FIG. 8 of the present invention.

The buyer confirmation module 126 for confirming the delivery and authenticity of the data file by allowing the buyer to input the cryptographic file hash value of the received data file. The buyer confirmation module 126 matches the hash value of the received data file with the hash value integrated into the marketplace data set by the data signature module 122. The buyer confirmation 126 is explained in detailed in conjunction with FIG. 9 of the present invention.

The seller delivers the data file to the buyer using any peer-to-peer data transfer medium. Examples of the data transfer include but are not limited to: Email attachment, Skype, File Transfer Protocol, Dropbox, IronBox, OneDrive and Amazon S3.

Figure 2:
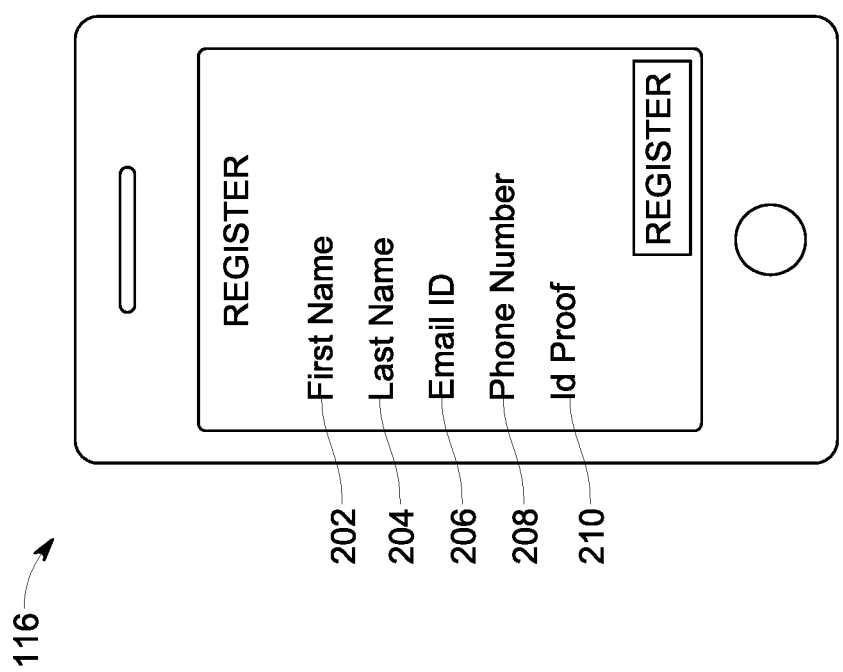
FIG. 2 illustrates a screenshot showing of a registration module for registering sellers and buyers in accordance with an exemplary embodiment of the present invention.

FIG. 2 illustrates a schematic diagram to show the registration module 116 in accordance with an exemplary embodiment of the present invention. The registration module 116 registers sellers and buyers on receiving details including but not limited to first name 202, last name 204, email ID 206, phone number 208, and ID proof 210 etc. It would be readily apparent to those skilled in the art that various other type of details may be envisioned to register sellers and buyers without deviating from the scope of the present invention.

Figure 3:
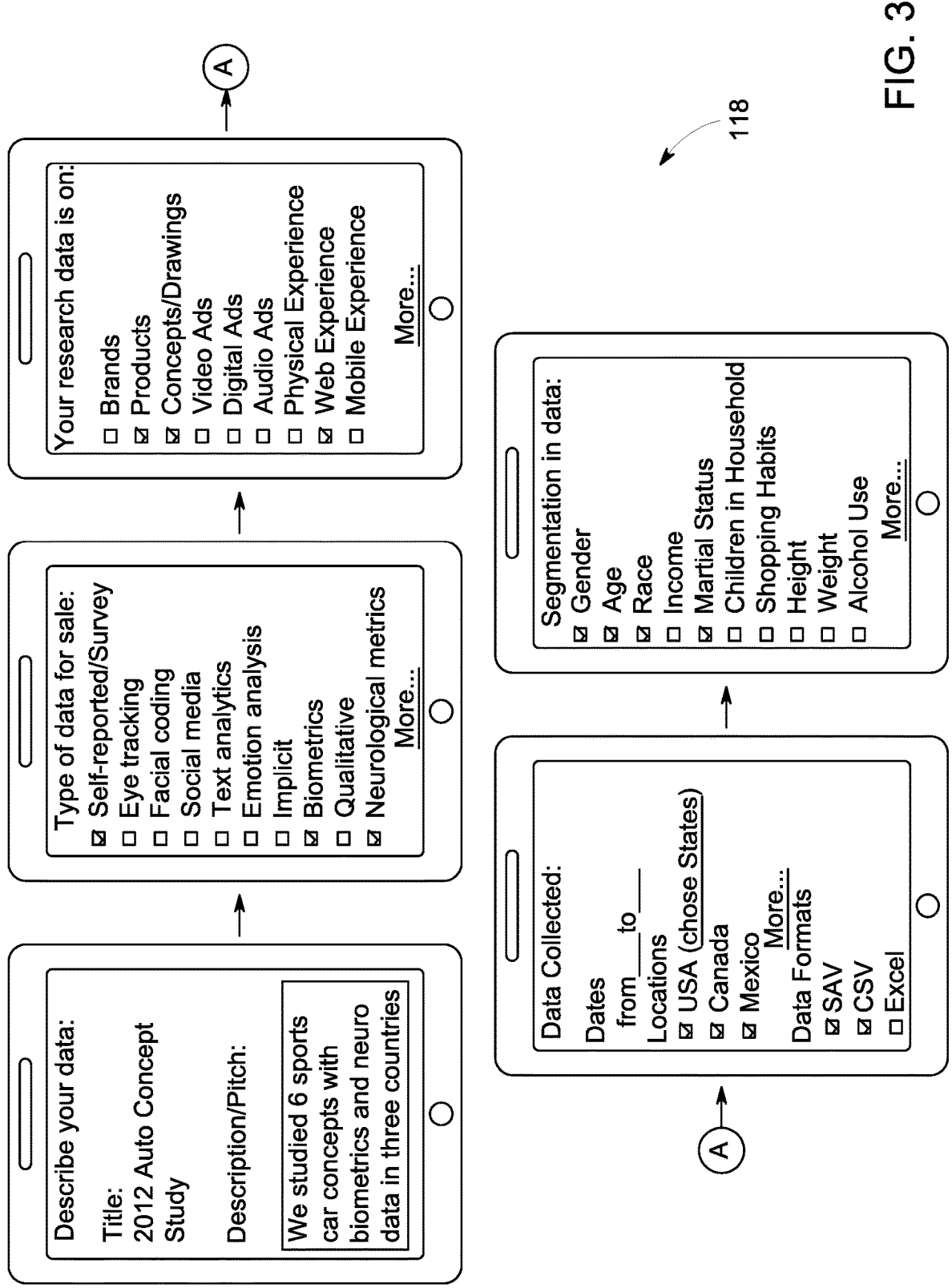
FIG. 3 illustrates a schematic flow diagram of a data management module to allow the sellers to describe the type of data in accordance with a preferred embodiment of the present invention.

FIG. 3 illustrates a schematic flow diagram to illustrate for data management module 118 in accordance with an exemplary embodiment of the present invention. The data management module 118 allows the sellers to define the type of data to be sold. For exemplary purposes, example of the type of data includes but not limited to survey, eye tracking, facial coding, social media, text analytics, biometrics etc. Further, the data management module 118 allows the seller to describe the type of data is on including but not limited to brands, products, concepts, video ads, digital ads, audio ads, physical experience etc.

The data management module 118 further allows the seller to describe dates, locations and format on which the data is collected. Further, the data management module 118 allows the seller to describe the segmentation in the data including but not limited to gender, age, race, income, marital status, children in household, shopping habits, height, weight etc. The data management module 118 further allows the seller to enter a price for selling the data.

Figure 4:
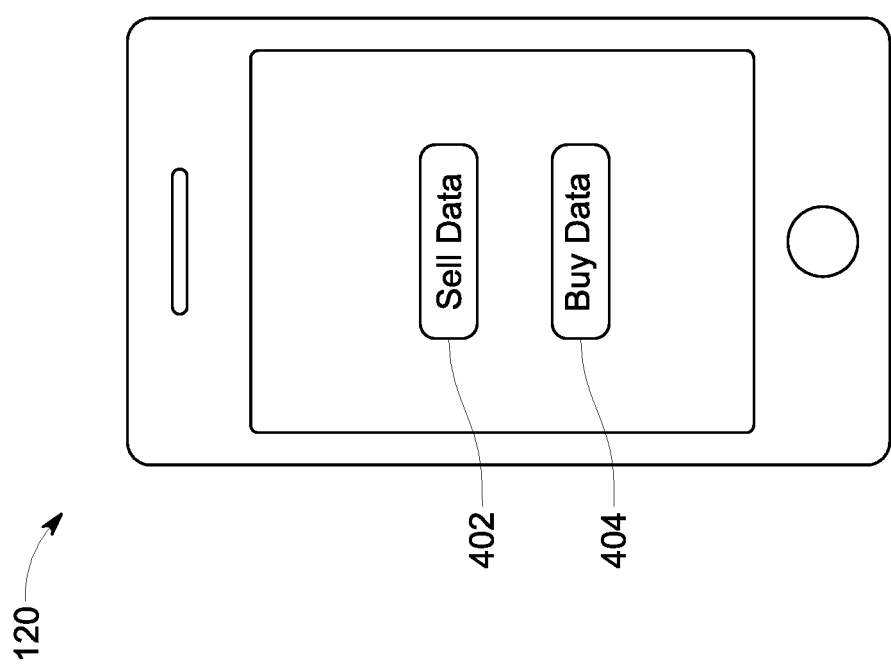
FIG. 4 illustrates a screenshot showing of a purpose module to allow users to perform either selling or buying of data in accordance with a preferred embodiment of the present invention.

FIG. 4 illustrates a screenshot showing of a purpose module 120 in accordance with another exemplary embodiment of the present invention. The purpose module 120 allows the registered users to either sell data 402 or buy data 404.

Figure 5:
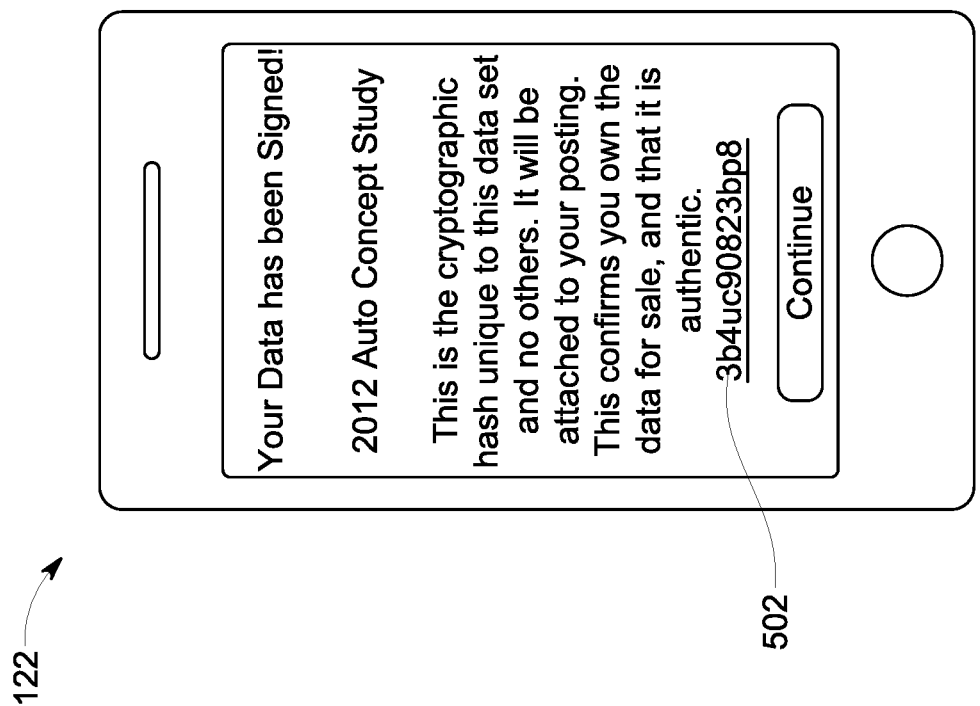
FIG. 5 illustrates a screenshot showing of a data signature module in accordance with a preferred embodiment of the present invention.

FIG. 5 illustrates a screenshot showing of a data signature module 122 in accordance with a preferred embodiment of the present invention. The data signature module 122 automatically computes a unique cryptographic file hash value on the accessed data file. Further, the data signature module 122 integrates the hash value into the data set to ensure the authenticity of the accessed data file. For exemplary purposes, the hash value 502 to be integrated to the data set is '3b4uc90823bp98'.

Figure 6:
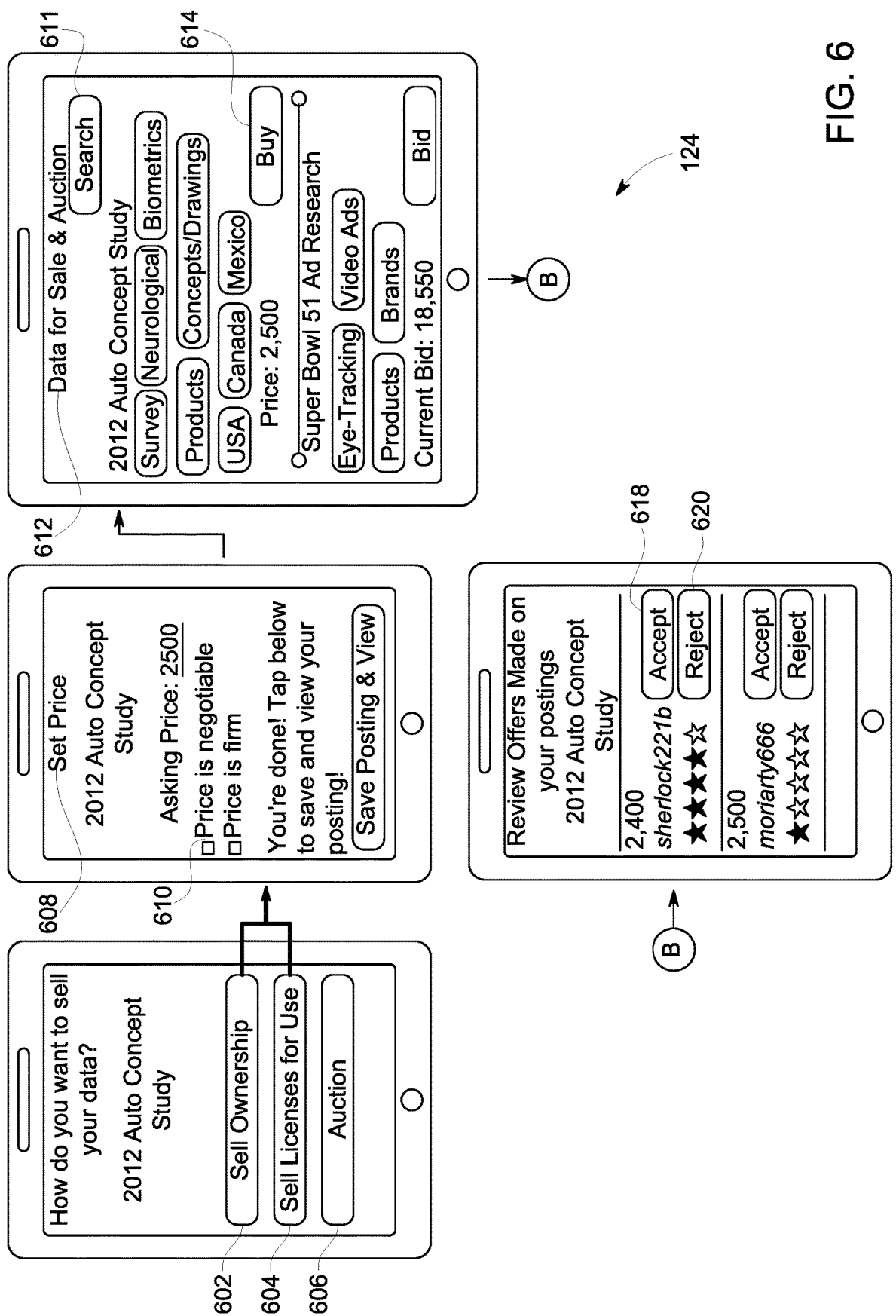
FIG. 6 illustrates a schematic flow diagram of a data transaction module in accordance with a preferred embodiment of the present invention.

FIG. 6 illustrates a schematic flow diagram of a data transaction module 124 in accordance with a preferred embodiment of the present invention. The data transaction module 124 allows the seller to perform either sell ownership 602 or selling licenses 604 or auction 606 of the data files. The data transaction module 124 further allows the buyer to transfer payment for the transaction of the data file in the decentralized marketplace.

In another preferred embodiment of the present invention, the data transaction module 124 allows the seller to create a set price 608 and other related instructions 610 for the sale of data. For exemplary purposes as shown in FIG. 6, the set price 608 is 2500, the related instructions 610 is price is negotiable or price is firm.

Further in another preferred embodiment of the present invention, the data transaction module 124 allows the buyer to search for the data by entering related keywords in the SEARCH 611 tab. Further, the data transaction module 124 allows the buyer to purchase the data by clicking BUY 614.

Further in another preferred embodiment of the present invention the data transaction module 124 allows the buyer to review and purchase data for sale and auction 612. For exemplary purposes as shown in FIG. 6, the data for sale and auction 612 is '2012 Auto Concept Study'. Various exemplary sub-categories under the data are 'Survey, Neurological, Biometrics Products' etc.

Further in another preferred embodiment of the present invention, the data transaction module 124 allows the seller to review offers made on his postings 616. For exemplary purposes as shown in FIG. 6, the seller sees bid of 2400 from buyer 'Sherlock221b' and 2500 from buyer 'moriarty666'. Further the seller is able to either accept 618 or reject 620 the offers.

Figure 7:
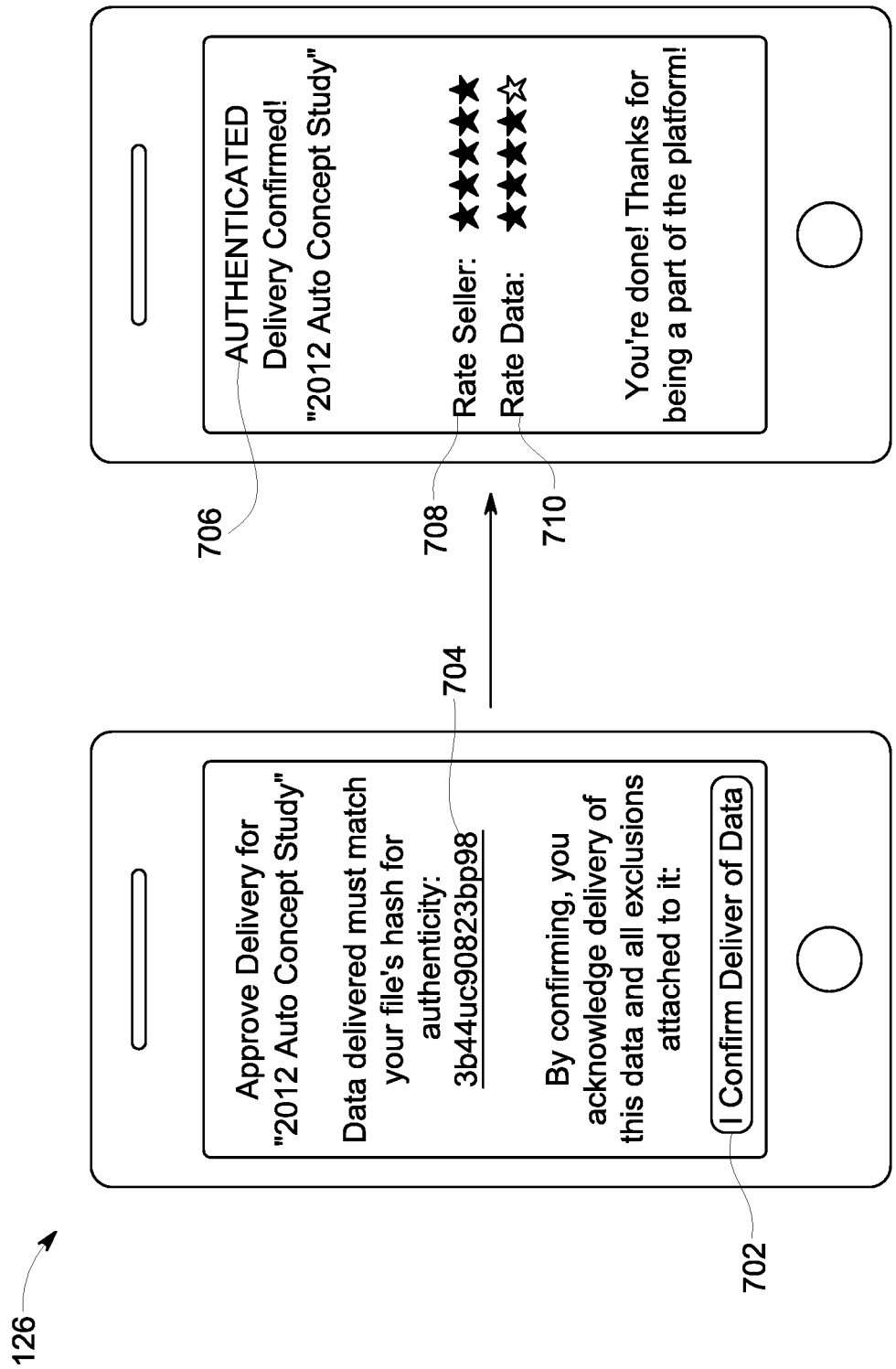
FIG. 7 illustrates a schematic flow diagram of a buyer confirmation module in accordance with a preferred embodiment of the present invention.

FIG. 7 illustrates a schematic view of showing of a buyer confirmation module 126 in accordance with a preferred embodiment of the present invention. The buyer confirmation module 126 confirms the delivery and authenticity of the data file by allowing the buyer to input the hash value of the received data file. Further, the buyer confirmation module 126 matches the hash value of the received data file with the hash value integrated into the marketplace data set by the data signature module.

In an exemplary embodiment as shown in FIG. 7, the buyer confirmation module 126 allows the buyer to confirm the delivery of the data file by allowing the buyer to click on tab 702 stating "I Confirm Delivery of Data". The hash value 704 '3b4uc90823bp98' is computed from the received data file.

Further in another preferred embodiment of the present invention, the buyer confirmation module 126 matches the hash value 704 with the hash value (502, as shown in FIG. 5). Upon confirming the match, the buyer confirmation module 128 confirms authenticated delivery of the data file by displaying AUTHENTICATED 706.

In another preferred embodiment of the present invention, the buyer confirmation module 126 allows the buyer to rate seller 708 and rate data 710. The buyer rates the seller on the basis of the professionalism and efficiency of the transaction. In an exemplary embodiment of the present invention, the buyer gave 4 stars to the seller. Further, the buyer is able to rate data 710 on the basis of the quality of the data.

Figure 8:
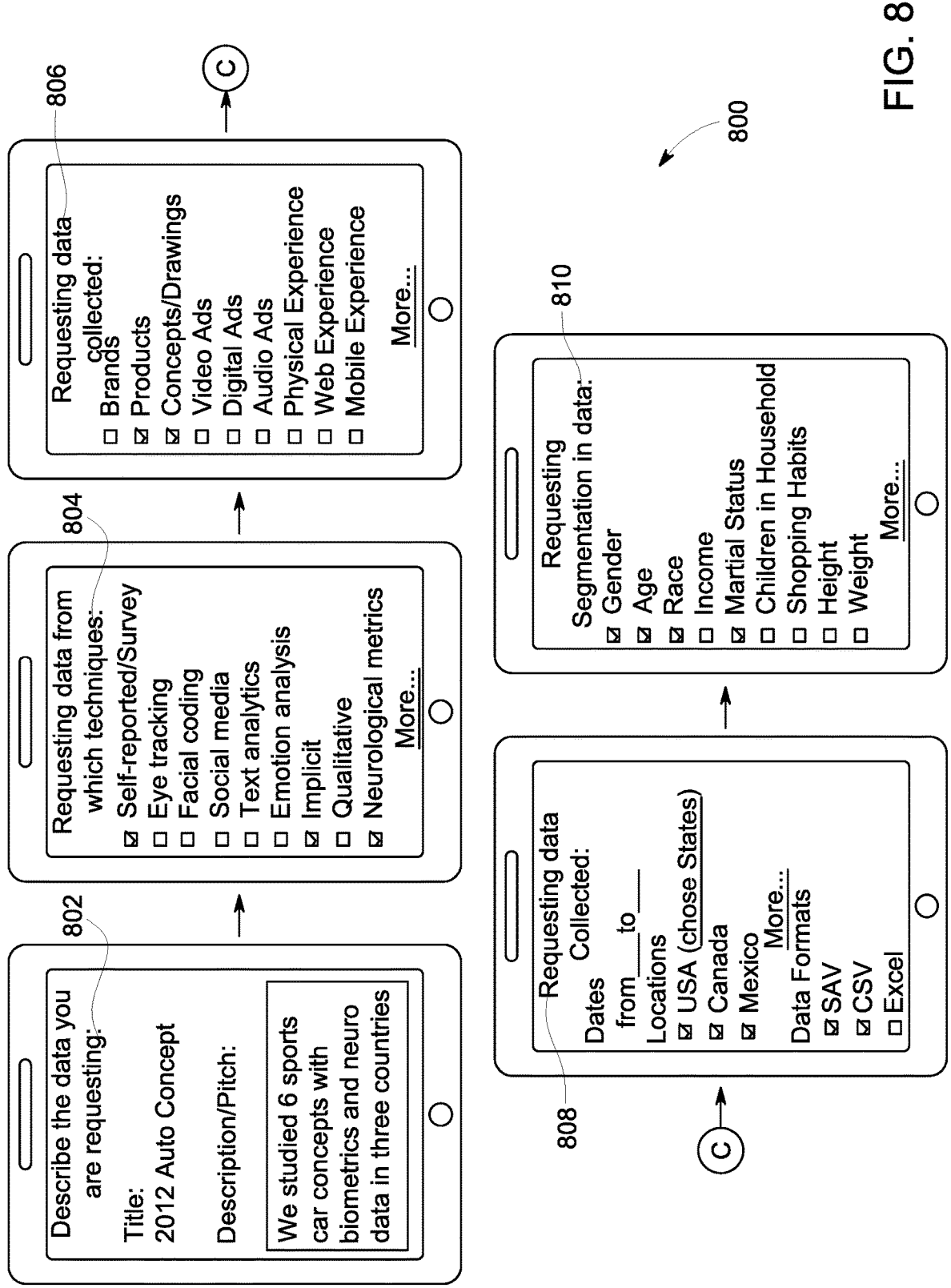
FIG. 8 illustrates a schematic flow diagram of a buyer request module in accordance with another exemplary embodiment of the present invention.

FIG. 8 illustrates a schematic flow diagram of a buyer request module 800 in accordance with another exemplary embodiment of the present invention. The buyer request module 800 allows the buyer to request data not already found on the marketplace.

The buyer request module 800 allows the buyer to describe the data such as Title 802, Description/Pitch 804, Requesting data from which techniques 806, Requesting data on 808, and Requesting Segmentation in data 810. For exemplary purposes, the buyer enters 2018 Auto Concepts in the Title 802.

The buyer selects techniques such as self-reported/Survey, implicit, neurological metrics from various techniques such as eye tracking, facial coding etc in the Requesting data from which techniques 804. The buyer further requests data on brands, products, concepts/drawings, video Ads, digital Ads, Audio Ads, physical experience etc in the Requesting data on 806.

The buyer requests data collected depending upon factors such as dates, locations, formats etc. by using Requesting Data Collected 808. Further, the buyer requests segmentation in data using factors such as gender, age, race, income, marital status, children in household, shopping habits etc. using Requesting Segmentation in data 810.

Figure 9:
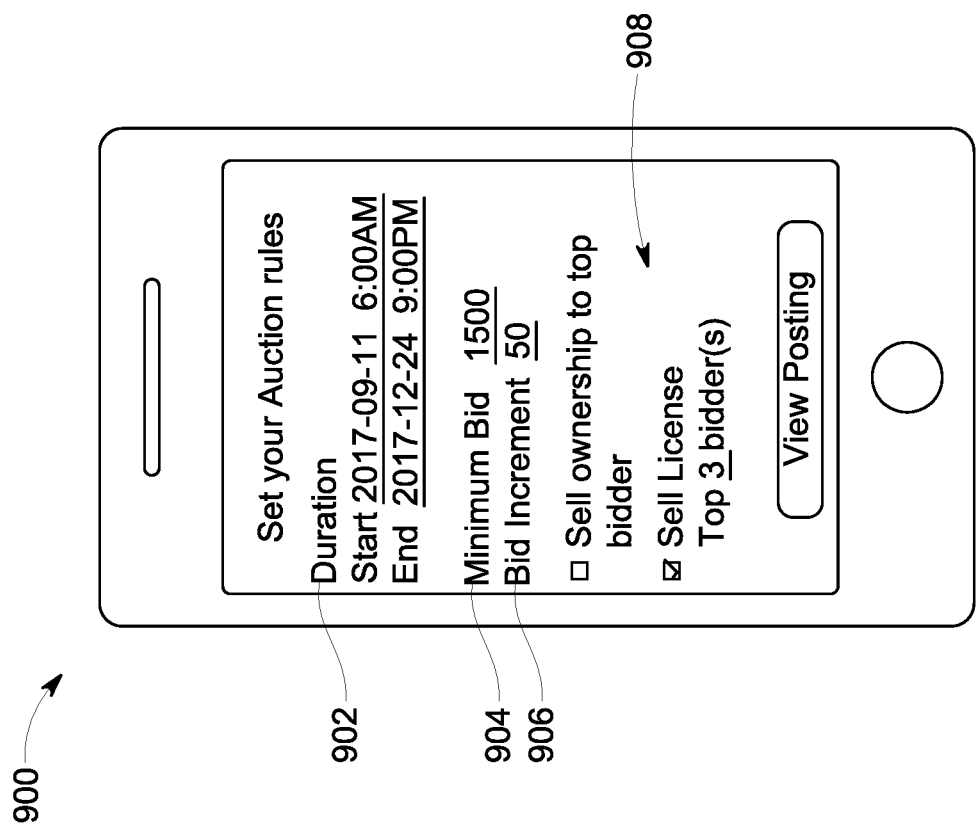
FIG. 9 illustrates a schematic flow diagram of a data auction module in accordance with another exemplary embodiment of the present invention.

FIG. 9 illustrates a schematic flow diagram of a data auction module 900 in accordance with another exemplary embodiment of the present invention. The data auction module 900 allows the seller to setup rules for auctioning of the data. Examples of the rules include but not limited to Duration 902, Minimum Bid 904, Bid Increment 906, type of sale 908 etc. For exemplary purposes, the start date is 2018-09-11 6:00 AM, end date 2018-12-24 9:00 PM, minimum bid 1500, bid increment 50, sell ownership, sell license to top 3 bidders etc.

Figure 10:
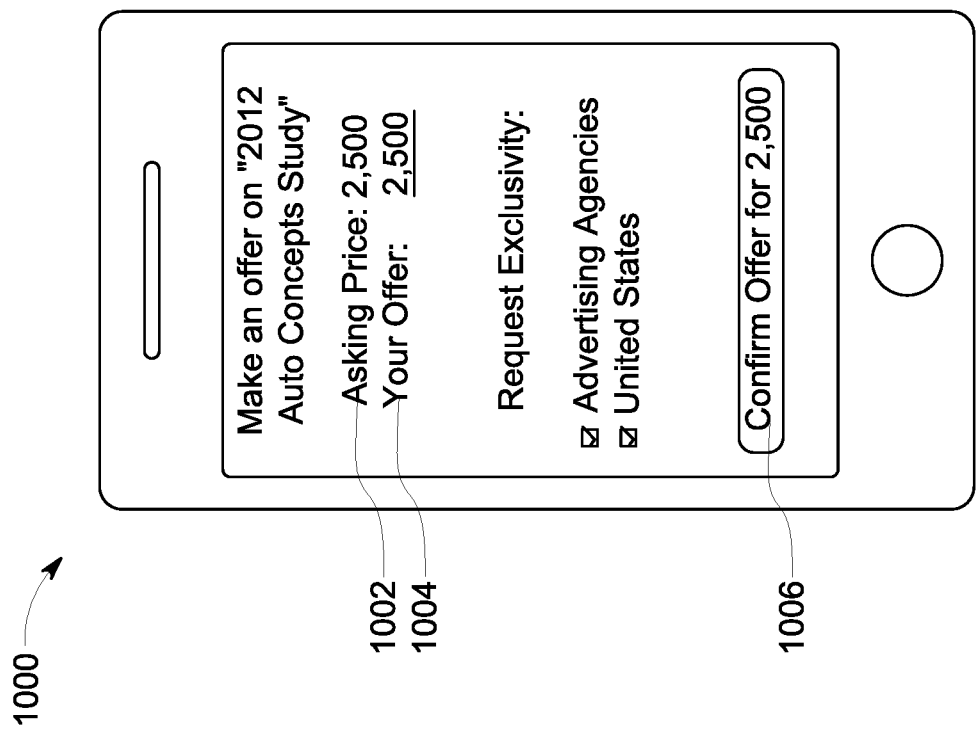
FIG. 10 illustrates a schematic flow diagram of a data buying module in accordance with another exemplary embodiment of the present invention.

FIG. 10 illustrates a schematic flow diagram of a data buying module 1000 in accordance with another exemplary embodiment of the present invention. The data buying module 1000 displays the asking price from the seller under Asking Price 1002 and further displays the buyer's offer to purchase the data under Your Offer 1004. For exemplary purposes, the Asking Price 1002 is 2500 and the Your Offer 1004 is 2500. The buyer then clicks Confirm Offer 1006 to confirm the buyer's offer to the seller.

Figure 11:
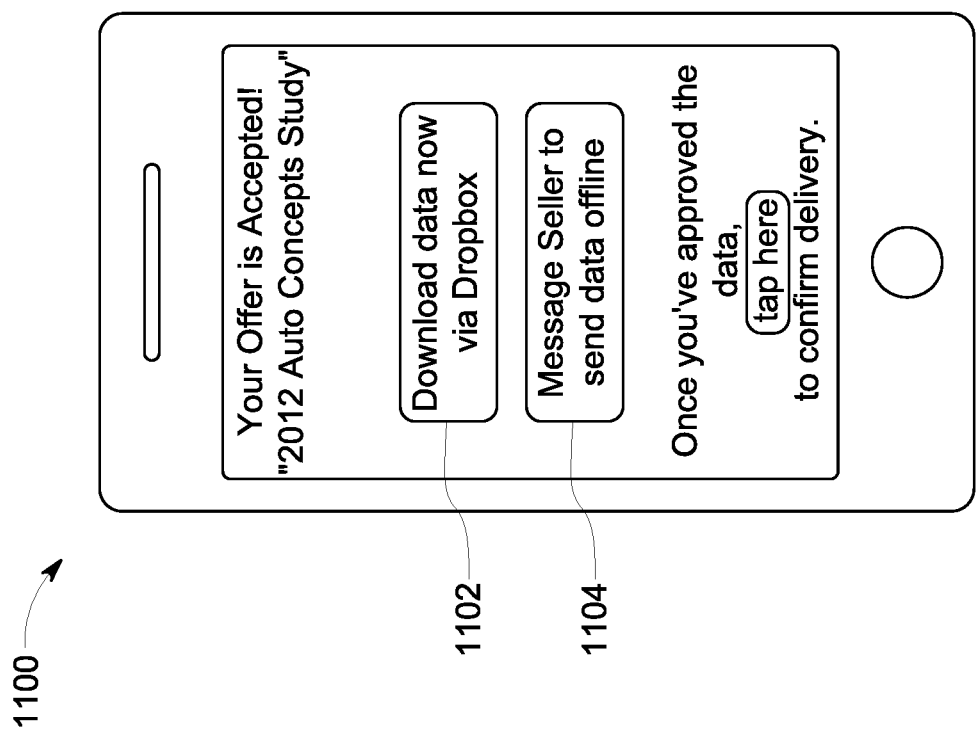
FIG. 11 illustrates a schematic flow diagram of a data sharing module in accordance with another exemplary embodiment of the present invention.

FIG. 11 illustrates a schematic flow diagram of a data sharing module 1100 in accordance with another exemplary embodiment of the present invention. The data sharing module 1100 displays the information to download or receive the data from the seller. The data may be received either by downloading directly via Dropbox 1102 or sending a message to the seller to send data offline 1104.

For exemplary purposes, the data is sent via Dropbox. However, it would be readily apparent to those skilled in the art that various ways of sharing or downloading the data may be envisioned without deviating from the scope of the present invention.

Figure 12:
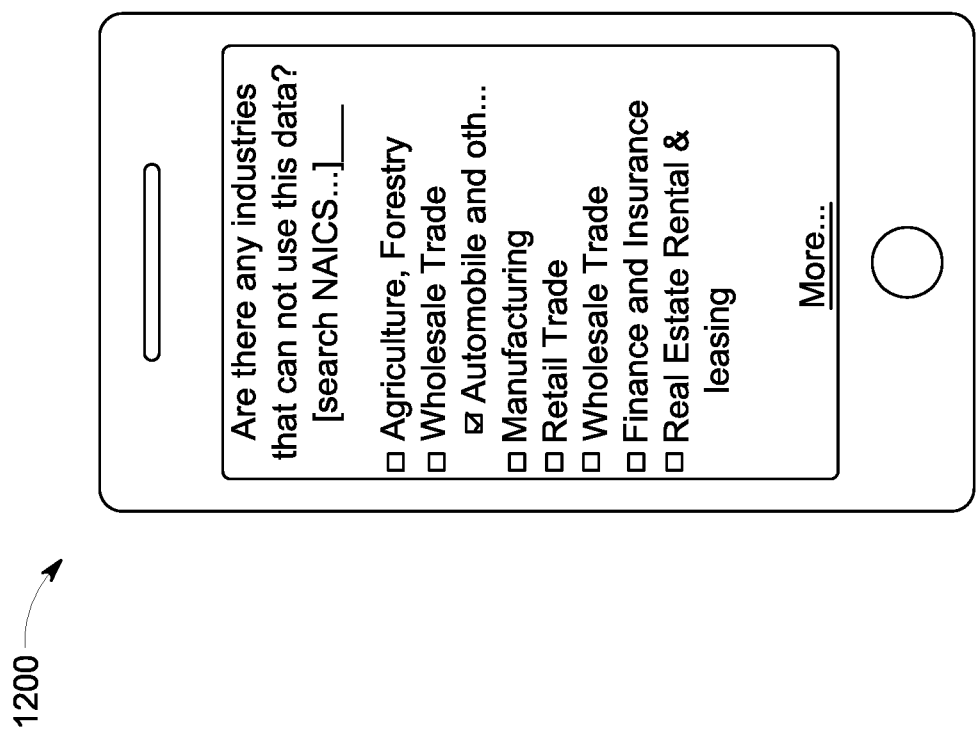
FIG. 12 illustrates a screenshot showing of a data confidentiality module in accordance with a preferred embodiment of the present invention.

FIG. 12 illustrates a screenshot showing of a data confidentiality module 1200 in accordance with another exemplary embodiment of the present invention. The data confidentiality module 1200 allows the seller to set rules for selling or licensing of data. For exemplary purposes as shown in FIG. 12, the rules may be like the data is available for a particular industry or not available for a particular industry such as agriculture, forestry, automobile, manufacturing, retail trade, wholesale trade, finance and insurance etc. Further, the rules may be like the data may be used in a particular country or not be used in a particular country.

For exemplary purposes, the data cannot be used in the Automobile and Other Motor Vehicles industry. However, it would be readily apparent to those skilled in the art that various types of data confidentiality may be envisioned without deviating from the scope of the present invention.

Figure 13:
FIG. 13 illustrates a table showing sale of data in the decentralized blockchain database in accordance with an exemplary embodiment of the present invention.

FIG. 13 illustrates a table 1300 showing sale of data in the decentralized blockchain database (106, show in FIG. 1) in an exemplary embodiment of the present invention. The table 1300 shows sale of data having a sale ID: 1447, Title: 2012 Auto Concepts study, User: Watson1, Types: Self-Reported/Survey; Biometrics; Neurological Metrics, Locations: USA; Canada; Mexico, Industries: Automobile, Cost: 2500, File Hash: 3b4uc90823bp98.

The posting of data for sale is stored in the decentralized blockchain database as a result set. The storing of result set allows the buyer to search and purchase the data file associated with the result set. Similarly, though not shown in FIG. 13, after the purchase of the data file, similar kind of information confirming the sale of the data file in the result set and authentication of the transaction is stored in the decentralized blockchain database.

The present invention offers a system for the research data marketplace that allows users to search, buy and sell research collected and analyzed. The present invention further guarantees recording the transfer of research data posted for sale such that both buyer and seller confirm both the authenticity of the transaction and the data transferred, without ever revealing the confidentiality of the research data itself. The system and method further allows for searching for providers of data, auctioning of research data, assessments of buyers, sellers and data, and other attributes that drive the value of a marketplace for transacting in research and any currency or cryptocurrency.

Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

The invention claimed is:

1. A system for providing a peer-to-peer exchange of one or more data files and payments between a seller computing device and a buyer computing device over a communication network in a decentralized marketplace, the system comprising:
   a decentralized blockchain database configured to store information related to selling and buying of one or more data files in the decentralized marketplace;
   a private database configured to store information related to personal data related to sellers and buyers;
   a plurality of modules configured to access information from the decentralized blockchain database;
   a graphical user interface to display processed modules;
   a processing unit coupled to the decentralized blockchain database, the private database and the graphical user interface to process the plurality of modules, wherein the plurality of modules comprises:
      a registration module configured to allow the sellers and the buyers to register on the decentralized marketplace;
      a data management module configured to allow the seller to describe a type of data in at least one data file of the one or more data files, and create a data set for allowing buyers to search for the at least one data file;
      a purpose module configured to allow users to perform either selling or buying of at least one data file of the one or more data files on the decentralized marketplace;
      a data signature module configured to automatically compute a cryptographic hash value on the at least one data file, and the data signature module further configured to integrate the cryptographic hash value into the data set to ensure the authenticity of the at least one data file;
      a data transaction module configured to allow the seller to perform either selling of ownership or selling licenses or auctioning of the at least one data file, and the data transaction module further configured to transfer payment for the at least one data file in the decentralized marketplace, wherein the buyer receives the at least one data file from the seller using a peer-to-peer data transfer medium; and
      a buyer confirmation module configured to confirm delivery and authenticity of the at least one data file by allowing the buyer to input the cryptographic hash value of the received at least one data file, the buyer confirmation module further configured to match the cryptographic hash value of the received at least one data file with the cryptographic hash value integrated into the data set by the data signature module.

2. The system according to claim 1 wherein the type of data comprises at least one of: a categorical data; quantitative research methods; binary data; encrypted data; qualitative research methods; online communities; mobile surveys; webcam-based interviews; text analytics; social media analytics; big data analytics; mobile ethnography; eye tracking; micro-surveys; behavioral economics; research gamification; applied neuroscience; implicit/non-conscious methods; facial analysis; prediction markets; crowdsourcing; Internet of Things; biometric response; virtual environments/virtual reality; sensor/usage/telemetry data; and wearables-based research.

3. The system according to claim 1, wherein the data management module allows segmentation of data within the at least one data file, and wherein the segmentation comprises at least one of: demographic; geographic; psychographic; behavioral; cultural and contextual/situational segments.

4. The system according to claim 1 further comprising a buyer request module to allow the buyer to request a data file not already found on the marketplace.

5. The system according to claim 1 further comprising a data auction module to allow the seller to setup rules for auctioning of the at least one data file.

6. The system according to claim 1 further comprising a data confidentiality module to allow the seller to setup rules to restrict purchasing of the at least one data file.

* * * * *